United States Patent Office 2,718,504
Patented Sept. 20, 1955

---

2,718,504

OIL SOLUTION OF POLYMERIZED CARBONATE ESTER

Jeffrey H. Bartlett, Westfield, N. J., assignor to Esso Research and Engineering Company, a corporation of Delaware No Drawing. Original application February 15, 1951, Serial No. 211,189, now Patent No. 2,673,185, dated March 23, 1954. Divided and this application February 27, 1953, Serial No. 339,483

3 Claims. (Cl. 252—56)

This invention relates to novel lubricating oil additives which impart to lubricating oils the desirable characteristics of lowering their pour point and increasing their viscosity index.

In the manufacture of lubricating oil, as well as oils for other purposes, it is frequently desirable to change their viscosity characteristics so that they will flow freely at low temperatures and will remain more nearly uniform, as expressed by the concept of the viscosity index. Among the pour depressant additives known to the art are the condensation products of paraffinic materials such as chlorinated paraffin wax with aromatic compounds such as naphthalene. It has now been discovered that certain pour depressors may be obtained by polymerizing unsaturated carbonic acid esters having at least one long chain hydrocarbon group containing from 8 to 18 carbon atoms.

It is known to the art that carbonic acid esters impart to lubricating and other oils the desirable characteristics of improving the penetration or spreading qualities of said oils as has been disclosed in United States Patent No. 2,263,265. Generally, low molecular weight esters such as the ethyl carbonate, butyl carbonate, amyl carbonate and the like are preferred for this purpose. It has now been discovered that the polymers of carbonic acid esters wherein one polymerizable carbonic acid ester group is present and which also contain at least one long chain hydrocarbon ester radical, impart the desirable characteristics of a low pour point and a high viscosity index. The presence of long chain hydrocarbon groups is of importance in producing oil soluble products and for imparting the desired properties of lower pour point and increasing viscosity index. The molecular weight of the polymer products may vary from 1,000 to 20,000 although lower and higher molecular weight products also have valuable properties as lube oil additives.

Valuable products may also be prepared by copolymerizing unsaturated carbonic acid esters with other olefinic materials such as vinyl esters, vinyl chloroacetate, vinyl ethers, vinyl halides, vinyl ketones, vinyl sulfones, vinyl acetals, tetrahydrofurane, maleates, fumarates, acrylates, methacrylates, butadiene, styrene, isobutylene and the like. If any of the above mentioned olefinic materials possess chains of about 8 to 18 carbon atoms, it may be possible to utilize carbonate esters possessing less than 8 to 18 carbon atoms. It is necessary that at least one long chain group be present in the copolymer. The copolymerization reaction may be effected with catalysts as will be described for the polymerization of the carbonate esters.

In the preparation of carbonic esters suitable for polymerization or copoymerization reaction, it is necessary to have at least one olefinic group in the monomer. Such olefinic groups may be derived from unsaturated alcohols as allyl alcohol, methallyl alcohol, methyl vinyl carbinol, crotyl alcohol, chloroallyl alcohol, chlorcrotyl alcohol, butene diol and the like. Unsaturated groups may also be derived from other sources and include various types of unsaturated radicals such as vinyl and the like.

The long chain radical which is present in the mixed carbonate ester may be derived from primary or secondary alcohols containing from 8 to 18 carbon atoms. A commercially available mixed alcohol, known as "Lorol B," is particularly useful in preparing the ester. This mixed alcohol is obtained by the hydrogenation of coconut oil and consists of a large proportion of lauryl alcohol and smaller amounts of decyl, tetradecyl, cetyl and octadecyl alcohols. In the commercial product the alkyl groups have an average number of carbon atoms of about 13.5. Especially successful results have been obtained with the use of this alcohol. Straight chain or slightly branched alcohols are highly suitable, but more highly branched chain alcohols may be used provided they contain a straight chain of about six or more carbon atoms. Synthetic alcohols such as those produced as a by-product in the synthesis of hydrocarbons from CO and hydrogen, or Oxo alcohols produced from olefins, CO and hydrogen, may be used. Cyclic alcohols, hydroxy esters, phenols, alkylated phenols, alkoxy glycols and polyglycols, etc., may also be employed.

Various methods may be used in the preparation of the carbonate esters. A convenient method consists of the reaction of $COCl_2$ with the alcohols by a two step process. In the first step the chloroformates are produced and the neutral carbonate esters are produced in the second step. Thus, it is possible to produce a mixed ester having side chains as desired.

The carbonate esters possessing an olefinic group may be polymerized to yield relatively high molecular weight products by the use of suitable catalysts. Among these catalysts are peroxides such as benzoyl peroxide, cumene hydroperoxide, urea peroxide, etc., $AlCl_3$, $BF_3$, clay, alumina, oxygen, and ozone. The polymerization may be carried out in the presence of a diluent in order to control the molecular weight of the product. Copolymerization of carbonate esters with other polymerizable organic materials may be catalyzed by there same materials. Suitable reaction conditions when employing peroxide catalysts are 0.1 to 10% by weight of catalyst, 50 to 175° C., and reaction times of from 1 to 50 hours.

Valuable carbonate esters of relatively high molecular weight may also be prepared from polyhydric alcohols such as pentaerythritol, sorbitol, polyvinyl alcohol, polymerized allyl alcohol, etc. In such cases it is desirable to have a long straight chain as one of the side chains of the carbonate. A convenient method of preparing such products is through the reaction of a long chained chloroformate with the polyhydric alcohol. Variations of this method may also be made in such a way that only a portion of the hydroxyl groups is esterified with the chloroformates while the remaining hydroxyl groups are esterified with dibasic or polybasic acids. Thus, it is possible to obtain products of still higher molecular weight.

The products which are prepared according to this invention impart valuable properties to lubricating oils when used in small quantities of about 0.01% to 5% by weight. However, still larger quantities may be used with beneficial effects. Some of the properties which these products impart are lower pour points and higher viscosity index and in addition act as oxidation inhibitors, corrosion and rust inhibitors, sludge dispersers, antifoam agents, extreme pressure agents, and the like.

The following examples illustrate some of the features of this invention:

EXAMPLE I

An Erlenmeyer flask was charged with 207.5 g. of Lorol B alcohol and 95 g. of pyridine and the contents cooled to 50° F. The mixture was frequently shaken during 1¼ hours while 132.6 g. of allyl chloroformate was added dropwise. During this time the reaction mixture was maintained at 50° to 70° F. The mixture was then allowed to stand at room temperature for an hour after which it was washed with dilute HCl, then with NaCl solution and finally with water until neutral to litmus paper. The final product of allyl Lorol B carbonate which was dried with CaCl$_2$ had a neutralization number of 0.09 and a viscosity at 210° F. of 32.5 Saybolt seconds.

25 x 200 mm. test tube was charged with 40 g. of allyl Lorol B carbonate prepared according to the above paragraph. After displacing the air with nitrogen, 2.0 g. of powdered benzoyl peroxide was added and the mixture again blown with nitrogen until the peroxide had dissolved. The test tube was then stoppered and put in an oven at 75° C. for 16 hours followed by 20 hours at 150° C. At the end of this time, the product had a viscosity at 210° F. of 48.2 Saybolt seconds.

EXAMPLE II 25 x 200 mm. test tube was charged with 32 g. of allyl Lorol B carbonate prepared according to Example I and 8 g. of vinyl acetate. After displacing the air with nitrogen, 2.0 g. of powdered benzoyl peroxide was added and gently blown with nitrogen until the peroxide was dissolved. The mixture was then stoppered and placed in an oven at 75° C. for 16 hours. The resultant copolymer had a viscosity at 210° F. of 167.1 Saybolt seconds.

The polymeric materials obtained in the above examples were tested for pour point depressing properties in reference oils consisting of the following: Oil A is an extracted Mid-Continent neutral and a bright stock, SAE-10; oil B is a conventionally refined Mid-Continent neutral and bright stock, SAE-10.

The polymeric materials, when blended in the above reference oils, had the following ASTM pour points:

Table I

| | Oil A, °F. | Oil B, °F. |
|---|---|---|
| Base Oil | +15 | +30 |
| Base Oil + 0.2% Allyl Lorol B Carbonate | −10 | +5 |
| Base Oil + 0.2% Allyl Lorol B Carbonate-Vinyl Acetate Copolymer | −25 | −10 |

It will be noted that the product of the present invention shows very marked pour depressant properties.

The above description is intended to be illustrative only. Any modification or variation which comforms to the spirit of the invention is intended to be included in the invention.

This application is a division of Serial No. 211,189 filed for the same inventor on February 15, 1951 now Patent No. 2,673,185.

What is claimed is:

1. A lubricating composition having a desirably low pour point which consists essentially of a major proportion of a waxy mineral oil containing combined therein a minor but pour depressing amount of a product formed by polymerizing a material having the general formula

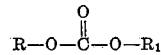

wherein R is an aliphatic hydrocarbon radical containing an olefinic carbon to carbon linkage derived from an unsaturated alcohol selected from the group consisting of allyl alcohol, methallyl alcohol, methyl vinyl carbinol and crotyl alcohol and R$_1$ is a saturated hydrocarbon chain of from 8 to 18 carbon atoms, said polymer having a molecular weight within the range of from 1,000 to 20,000 Staudinger.

2. A lubricating composition having a desirably low pour point which consists essentially of a major proportion of a waxy mineral oil containing combined therein a minor but pour depressing amount of a product formed by polymerizing a material having the general formula

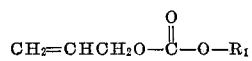

wherein R$_1$ is a hydrocarbon radical containing from 8 to 18 carbon atoms in a straight chain, said polymer having a molecular weight within the range of from 1,000 to 20,000 Staudinger.

3. A lubricating composition having a desirably low pour point which consists essentially of a major proportion of a waxy mineral oil containing combined therein from 0.01% to 5.0% by weight of a product formed by polymerizing a carbonic acid mixed ester, one ester group of which is that corresponding to allyl alcohol and the other is that corresponding to the mixture of alcohols obtained by hydrogenation of coconut oil, said mixture of alcohols having an average of 13.5 carbon atoms.

References Cited in the file of this patent
UNITED STATES PATENTS

| 2,402,486 | Adelson et al. | June 18, 1946 |
| 2,441,023 | Larsen | May 4, 1948 |
| 2,595,214 | Adelson et al. | May 6, 1952 |
| 2,673,185 | Bartlett | Mar. 3, 1954 |